(12) United States Patent
Havemose et al.

(10) Patent No.: US 9,069,729 B2
(45) Date of Patent: Jun. 30, 2015

(54) METHOD AND SYSTEM FOR PROVIDING HIGH AVAILABILITY TO DISTRIBUTED COMPUTER APPLICATIONS

(71) Applicant: Red Hat, Inc., Raleigh, NC (US)

(72) Inventors: Allan Havemose, Arroyo Grande, CA (US); Ching-Yuk Paul Ngan, Santa Clara, CA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 14/487,941

(22) Filed: Sep. 16, 2014

(65) Prior Publication Data

US 2015/0006958 A1   Jan. 1, 2015

Related U.S. Application Data

(60) Continuation of application No. 13/865,827, filed on Apr. 18, 2013, now Pat. No. 8,839,034, which is a division of application No. 13/333,456, filed on Dec. 21, 2011, now Pat. No. 8,433,951, which is a (Continued)

(51) Int. Cl.
  *G06F 11/00*  (2006.01)
  *G06F 11/20*  (2006.01)
  *G06F 11/14*  (2006.01)

(52) U.S. Cl.
  CPC ........ *G06F 11/2028* (2013.01); *G06F 11/1482* (2013.01); *G06F 11/2035* (2013.01); *G06F 11/1402* (2013.01); *G06F 2201/805* (2013.01)

(58) Field of Classification Search
  USPC .................................... 714/38.1, 41; 717/124
  See application file for complete search history.

(56) References Cited

U.S. PATENT DOCUMENTS 5,774,660 A   6/1998   Brendel et al.
6,026,499 A   2/2000   Shirakihara et al.
(Continued)

FOREIGN PATENT DOCUMENTS

WO   WO2007/130989 A2   11/2007

OTHER PUBLICATIONS

International Searching Authority/United States Patent Office, "Notification of Transmittal of the International Search Report and the Written Opinion of the International Searching Authority, or the Declaration," for PCT/US2007/67948, mailed Sep. 17, 2008, 7 pages.

(Continued)

*Primary Examiner* — Yolanda L Wilson
(74) *Attorney, Agent, or Firm* — Haynes and Boone, LLP

(57) ABSTRACT

Method, system, apparatus and/or computer program for achieving transparent integration of high-availability services for distributed application programs. Loss-less migration of sub-programs from their respective primary nodes to backup nodes is performed transparently to a client which is connected to the primary node. Migration is performed by high-availability services which are configured for injecting registration codes, registering distributed applications, detecting execution failures, executing from backup nodes in response to failure, and other services. High-availability application services can be utilized by distributed applications having any desired number of sub-programs without the need of modifying or recompiling the application program and without the need of a custom loader. In one example embodiment, a transport driver is responsible for receiving messages, halting and flushing of messages, and for issuing messages directing sub-programs to continue after checkpointing.

8 Claims, 8 Drawing Sheets

Related U.S. Application Data continuation of application No. 12/693,960, filed on Jan. 26, 2010, now Pat. No. 8,108,722, which is a continuation of application No. 11/741,535, filed on Apr. 27, 2007, now Pat. No. 7,681,075.

(60) Provisional application No. 60/797,219, filed on May 2, 2006.

(56) References Cited

U.S. PATENT DOCUMENTS

| | | | |
|---|---|---|---|
| 6,154,877 A | 11/2000 | Rumkumar et al. | |
| 6,161,219 A | 12/2000 | Ramkumar et al. | |
| 6,484,276 B1 * | 11/2002 | Singh et al. | 714/41 |
| 6,718,538 B1 | 4/2004 | Mathiske | |
| 6,823,474 B2 | 11/2004 | Kampe et al. | |
| 7,096,388 B2 | 8/2006 | Singh et al. | |
| 7,293,200 B2 * | 11/2007 | Neary et al. | 714/35 |
| 7,302,609 B2 | 11/2007 | Matena et al. | |
| 7,380,155 B2 | 5/2008 | Fung et al. | |
| 7,623,684 B2 * | 11/2009 | Kanchwala et al. | 382/115 |
| 7,712,085 B2 * | 5/2010 | McCollum et al. | 717/130 |
| 7,725,763 B2 | 5/2010 | Vertes et al. | |
| 2005/0050304 A1 | 3/2005 | Muherjee et al. | |
| 2005/0251785 A1 | 11/2005 | Vertes et al. | |
| 2006/0085679 A1 | 4/2006 | Neary et al. | |
| 2006/0090097 A1 | 4/2006 | Ngan et al. | |
| 2006/0143512 A1 | 6/2006 | Jia et al. | |
| 2007/0277056 A1 | 11/2007 | Varadarajan et al. | |

OTHER PUBLICATIONS

Nam, H., "Probabilistic Checkpointing", IEICE Trans Inf & Syst, vol. E85D, pp. 1-12, Jul. 2002.

Sancho, J., "On the Feasibility of Incremental Checkpointing for Scientific Computing", IEEE Proceedings of the 18$^{th}$ International Parallel and Distributed Processing Symposium, pp. 1-9, Apr. 2004.

* cited by examiner

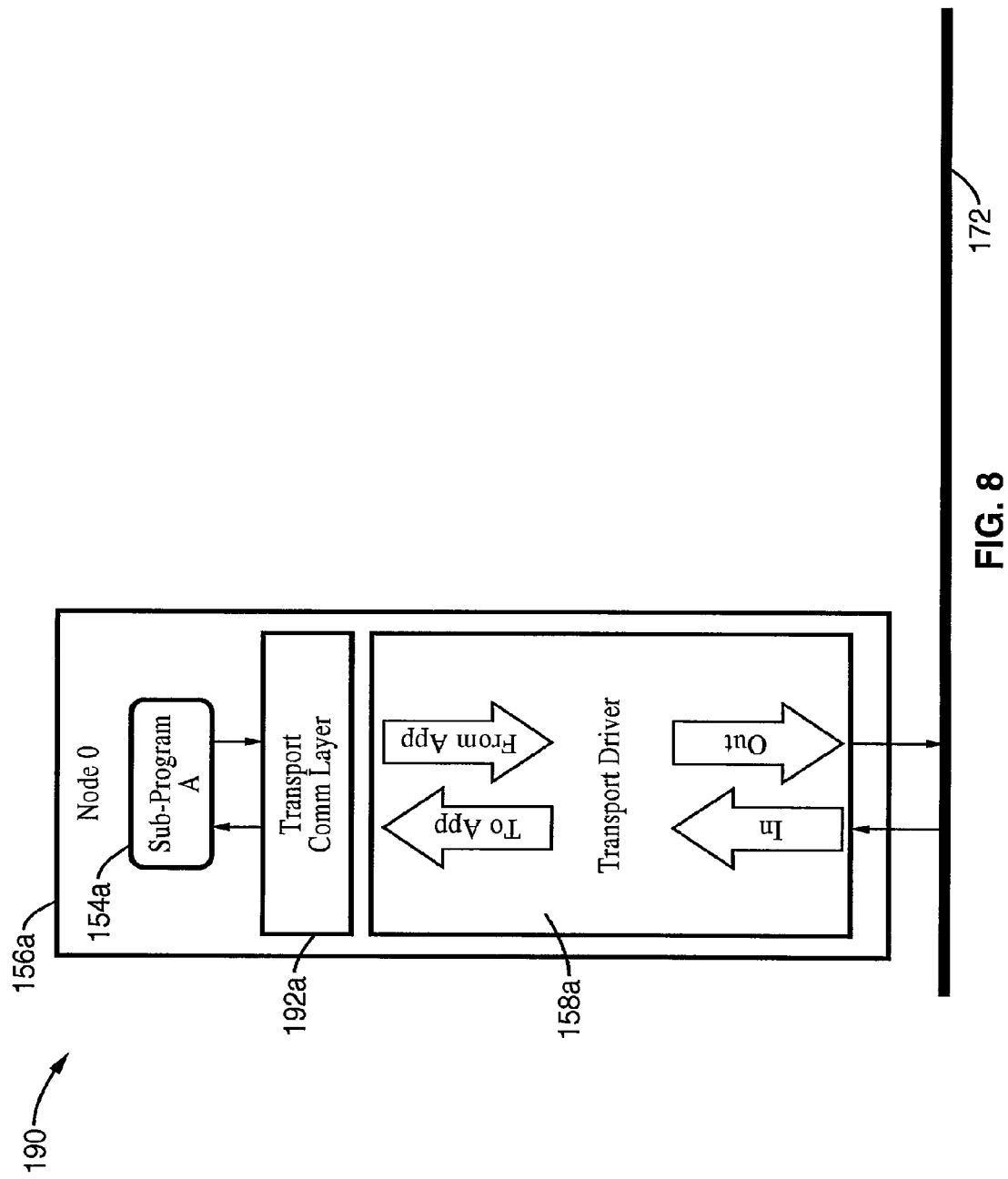

METHOD AND SYSTEM FOR PROVIDING HIGH AVAILABILITY TO DISTRIBUTED COMPUTER APPLICATIONS

CROSS-REFERENCE TO RELATED APPLICATIONS

This application is a continuation of and claims priority from U.S. patent application Ser. No. 13/865,827, filed Apr. 18, 2013, now U.S. Pat. No. 8,839,034 issued on Sep. 16, 2014, which is a divisional of U.S. patent application Ser. No. 13/333,456, filed Dec. 21, 2011, now U.S. Pat. No. 8,433,951 which issued on Apr. 30, 2013, which is a continuation of and claims priority from U.S. patent application Ser. No. 12/693,960 filed on Jan. 26, 2010, now U.S. Pat. No. 8,108,722 issued on Jan. 31, 2012, which is a continuation of and claims priority to U.S. patent application Ser. No. 11/741,535 filed on Apr. 27, 2007, now U.S. Pat. No. 7,681,075 issued on Mar. 16, 2010, which claims the benefit of U.S. Provisional Application No. 60/797,219 filed on May 2, 2006; these applications incorporated herein by reference in their entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Field of the Invention

This invention pertains generally to enterprise computer systems, computer networks, embedded computer systems, and computer systems, and more particularly with methods, systems and procedures (i.e., programming) for providing high availability services and automatic fault detection and recovery for computer applications distributed across multiple computers.

2. Description of Related Art

Enterprise systems operating today are subject to continuous program execution, that is 24 hours a day and 7 days a week. There is no longer the concept of "overnight" or "planned downtime". All programs and data must be available at any point during the day and night. Any outages or deteriorated service can result in loss of revenue as customers simply take their business elsewhere, and the enterprise stops to function on a global scale. Traditionally, achieving extremely high degrees of availability has been accomplished with customized applications running on custom hardware, all of which is expensive and proprietary. Furthermore, application services being utilized today are no longer run as single processes on a single server, yet are built instead from a collection of individual programs running on different servers. Traditionally, no mechanisms have existed for protecting these fully distributed applications. This problem is compounded by the fact that the individual applications comprising the service are typically provided by different vendors.

Two publications provide a background for understanding aspects of the current invention. A first publication is U.S. patent application Ser. No. 11/213,678 filed on Aug. 26, 2005, and published as US 2006-0090097 A1 on Apr. 27, 2006, incorporated herein by reference in its entirety, which describes providing transparent and automatic high availability for applications where all the application processes are executed on one node. A second publication is U.S. patent application Ser. No. 11/213,630 filed on Aug. 26, 2005, and published as US 2006-0085679 A1 on Apr. 20, 2006, incorporated herein by reference in its entirety, which describes technology to support stateful recovery of multi-process applications wherein the processes are running on the same node. However, the above-referenced publications do not fully address distributed applications where an application runs across multiple nodes at the same time, and where fault detection and recovery need to involve multiple independent nodes.

Therefore, a need exists for a method and system for achieving high availability and reliability for distributed applications, in a manner that is automatic, transparent to the client, and which does not require custom coding, custom applications, or specialized hardware.

BRIEF SUMMARY

A method, system, apparatus and/or computer program are described for achieving transparent high availability and lossless migration of distributed application programs. The system provides transparent migration and fail-over of distributed applications while ensuring that connected clients remain unaware of the migration. The client's connection and session are transparently transferred from the primary to the backup server without any client involvement.

In at least one embodiment, a high-availability services program is configured for automatically performing a number of application services, including: injecting registration code into sub-programs during launch, registering the distributed application, detecting execution failures, and executing from backup nodes in response to sub-program failure, application failure or node failure. The services can be integrated transparently into the system in that they are implemented on the system without the need of modifying or recompiling the application program and without the need of a custom loader.

The term "high-availability services" is utilized herein to designate a set of system-level services which protect distributed applications to assure that execution of these applications is provided with high availability. High availability can be generally considered a characteristic of a distributed application when a level of fault tolerance is provided to reduce or eliminate the possibility of losing access to the application as a consequence of sub-program or node failures. The high availability services run (execute) on each node (computer) of a network, grid, or other distributed communications configuration and protect all the distributed components of the distributed application.

The term "node" is utilized herein to designate one or more processors running a single instance of an operating system. A virtual machine, such as VMWare or XEN, is also considered a "node".

The term "grid" is utilized herein to designate a collection of nodes able to communicate via a network, custom backplane, or system busses.

The term "distributed application", "grid application" and "application" are utilized herein interchangeably. Each of these terms is meant to convey an application comprised of one or more sub-programs running on one or more nodes (i.e., computers), and in which all of the sub-programs jointly provide a service, such as for example running a large seismic computation.

The term "program" and "sub-program" is utilized to designate an individual application or a component of a larger distributed application. In practical terms, it is an executable that can run and produce a result on an individual node. Sub-programs can consist of one or more processes, all of which can be single or multi-threaded.

The term "coordinator" is utilized for designating a special control process running as an element of the invention. The coordinator is generally responsible for sending out coordination events and to coordinate activities across all sub-programs in a distributed application. For the sake of simplicity the coordinator is described as running on its own node, however, this is not a requirement as the coordinator can run on any desired node.

The term "transport" is utilized to designate the connection, mechanism and/or protocols used for communicating across the distributed application. Examples of transport include TCP/IP, Message Passing Interface (MPI), Myrinet, FiberChannel, ATM, shared memory, DMA, RDMA, system busses, and custom backplanes. In the following, the term "transport driver" is utilized to designate the implementation of the transport. By way of example, the transport driver for TCP/IP would be the local TCP/IP stack running on the host.

The term "Transport Communication Layer (TCL)" shall be used to designate the interface between the application and the transport as provided by the invention. The TCL is generally viewed as a component within the invention, but can also be directly provided by the transport or the application. By way of example, the TCL for TCP/IP may comprise a layer insulating the application from the local implementation of TCP/IP and providing services to be described below.

The term "channel" or "message channel" is utilized to designate the specific communication mechanism used by the implementation of the transport to communicate and move data, for example between the sub-programs and the transport itself. Generally "channels" are implemented using TCP/IP, sockets, pipes, FIFO, system busses, shared memory, backplanes or other proprietary messaging mechanism.

In the following descriptions, the product name "Duration" is utilized in referring to a system as described in the first and second references cited previously. It should be appreciated, however, that the teachings herein are applicable to other similarly configured systems.

The present invention comprises a set of system-level high-availability services for distributed applications. The high availability services run on each node (computer) on the grid and protect all the distributed components of the distributed application. One embodiment of the invention generally functions as an extension of the operating system executing on all grid nodes. A coordination mechanism is utilized to ensure that the execution of applications on the grid nodes are coordinated at certain points in time.

By way of example, and not of limitation, the present invention implements high availability for stateless applications (e.g., sendmail), stateful applications (e.g., Voice over IP (VOIP)), multi-tier enterprise applications (e.g., Apache, WebLogic and Oracle Database combined), and large distributed applications, for example those found in High Performance Computing (HPC), such as seismic exploration and financial modeling.

According to one aspect of the invention, the distributed application runs across a grid (i.e., of computer nodes), with sub-programs on one or more nodes. Each sub-program is protected individually and has one or more backup nodes ready to take over (execute the sub-program in the place of the original) in the event of a fault. The protection of the distributed program is thus coordinated across the grid and guaranteed to be consistent across the grid to assure high availability.

A distributed application can be configured according to the invention with any number of sub-programs running on any number of nodes. Each sub-program runs on a primary node while a backup node for the application stands ready to take over in the event of a fault and subsequent recovery. The primary and backup can be different nodes or the primary and backup can be the same node, in which case the fault recovery is local.

The invention provides layered high availability services for distributed applications, with high availability offered both across the grid and at the individual sub-program level. High availability, including fault detection and recovery, for the individual sub-programs is provided by Duration's existing stateful High Availability Services. The invention layers a distributed fault detection and recovery mechanism on top of the local fault detection and ensures that fault detection and recovery is consistent across the entire grid.

According to one aspect of the invention, a coordinator provides general coordination and synchronization for the individual sub-programs of the distributed applications. By way of example, and not limitation, the coordinator is shown running on a separate node from the sub-programs to simplify the following teachings. It should be appreciated, however, that this is not a requirement as the coordinator can run on any node in the system.

By way of example, and not of limitation, the invention implements stateless or stateful recovery of a distributed application by recovering each sub-program and ensuring all sub-programs are recovered in a consistent state. The recovery is automatic without any application or sub-program involvement.

According to an aspect of the invention, there is a clean separation of the application logic from the high-availability program code. This allows application programmers to focus on writing their application code, rather than on writing high availability code. An administrator can make applications highly available by simply configuring the desired settings, such as by using a graphical configuration tool implemented according to the invention. The result is that high availability applications are developed easily and deployed quickly without the necessity of custom coding.

According to another aspect of the invention, protection is provided against node faults, network faults and process faults. The present invention provides user-controlled system management, automatic availability management, and publish/subscribe event management, including notification of faults and alarms.

In various embodiments of the invention, features are provided that are useful for distributed applications that must be highly available, including but not limited to the following:

(a) Stateful high availability for distributed applications including high performance computing, financial modeling, enterprise applications, web servers, (b) Configurable protection levels.

(c) Coordinated Restart and stateful restore for distributed applications.

(d) Coordinated and transparent checkpointing of distributed applications.

(e) Coordinated full and incremental checkpointing for distributed applications.

(f) Checkpoints stored on local disks, shared disks, or memories.

(g) Automatic and transparent fault detection for distributed applications.

(h) Node fault detection.

(i) Process fault detection.

(j) Distributed application deadlock and hang protection through external health checks.

(k) Coordinated automatic and transparent recovery of distributed applications.

(l) Auto-startup of distributed applications.

(m) Script support of starting, stopping, or restarting.

(n) Dynamic policy updates.

(o) User-controllable migration of distributed applications.

The invention can be practiced according to various aspects and embodiments, including, but not limited to, those described in the following aspects and embodiments which are described using phraseology which is generally similar to the claim language.

According to an aspect of the invention a method for achieving transparent integration of a distributed application program with a high-availability protection program comprises: (a) injecting registration code, transparently and automatically, into all sub-programs during launch, without the need of modifying or recompiling the application program and without the need of a custom loader; (b) registering the distributed application automatically with the high-availability protection program; (c) detecting a failure in the execution of the distributed application program; and (d) executing the distributed application program with one or more sub-programs being executed from their respective backup servers automatically in response to the failure. The high-availability protection program is preferably configured as an extension of the operating system wherein recovery of application programs can be performed without modifying programming within said application programs. The high-availability protection can be configured for protecting against node faults, network faults, and process faults.

According to another aspect of the invention, a method, system, improvement or computer program for performing loss-less migration of a distributed application, including loss-less migration of all sub-programs from a their respective primary nodes to their backup nodes and while being transparent to a client connected to the primary node over a TCP/IP, MPI, system bus or other transport. The transport, i.e. TCP/IP, MPI, or system bus will be flushed and halted during checkpointing.

According to another aspect of the invention, a method, system, improvement or computer program performs loss-less migration of a distributed application, comprising: (a) migrating one or more sub-programs within an application, without loss, from their respective primary nodes to at least one backup node; (b) maintaining transparency to a client connected to the primary node over a transport connection; (c) flushing and halting the transport connection during the taking of checkpoints; and (d) restoring the one or more sub-programs from the checkpoints in response to initiating recovery of the application. The execution transparency to the client is maintained by a high-availability protection program configured to automatically coordinate transparent recovery of distributed applications. Transparency is maintained by a high-availability protection program to said one or more sub-programs running on a primary node while at least one backup node stands ready in the event of a fault and subsequent recovery.

According to another aspect of the invention, a method, system, improvement or computer program performs fault protection for applications distributed across multiple computer nodes, comprising: (a) providing high-availability application services for transparently loading applications, registering applications for protection, detecting faults in applications, and initiating recovery of applications; (b) taking checkpoints of one or more subprograms within applications executing across multiple computer nodes; (c) restoring the one or more sub-programs from the checkpoints in response to initiating recovery of one or more the applications; (c) wherein said high-availability application services are provided to the one or more sub-programs running on a primary node, while at least one backup node stands ready in the event of a fault and subsequent recovery; and (d) coordinating execution of individual subprograms within a coordinator program which is executed on a node accessible to the multiple computer nodes.

According to another aspect of the invention, a method, system, improvement or computer program performs loss-less migration of a distributed application program, comprising: (a) a high-availability services module configured for execution in conjunction with an operating system upon which at least one application can be executed on one or more computer nodes of a distributed system; and (b) programming within the high-availability services module executable on the computer nodes for loss-less migration of sub-programs within the at least one application for, (b)(i) checkpointing of all state in the transport connection, (b)(ii) coordinating checkpointing of the state of the transport connection across the distributed system, (b)(iii) restoring all states in the transport connection to the state they were in at the last checkpoint, (b)(iv) coordinating recovery within a restore procedure that is coupled to the transport connection.

According to another aspect of the invention, a system of multiple computer nodes over which distributed applications are protected against faults, comprising: (a) a plurality of computer nodes upon which applications can be executed; (b) an operating system configured for execution on each computer node and upon which applications are executed; (c) a high-availability services module configured for protecting applications from faults, and for executing in combination with the operating system; and (d) programming within the high-availability services module configured for execution on each computer node for, (d)(i) providing transparent application functions for loading applications, (d)(ii) registering applications for protection, (d)(iii) detecting faults in applications, and (d)(iv) initiating recovery of applications; (e) checkpointing of one or more sub-programs to create checkpoints for the application executing on at least one computer node; (f) restoring one or more sub-programs from the checkpoints when initiating recovery of the application; (g) executing one or more sub-programs on a primary node while at least one backup node stands ready for executing the sub-programs in the event of a fault and subsequent recovery; and (h) coordinating execution of individual subprograms within a coordinator program which runs on a node accessible to the plurality of computer nodes.

According to another aspect of the invention, a computer executable program for loss-less migration of a distributed application program, including loss-less migration of all sub-programs, comprising: (a) checkpointing of all state in the transport; (b) a checkpointing procedure that coordinates checkpointing of transport state across the grid; (c) a restore procedure that restores all state in the transport to the state they were in at the last checkpoint; (d) a restore procedure that hooks into the transport to coordinate the recovery.

According to another aspect of the invention, there is described a method, system, improvement and/or computer program for maintaining all transport connection across a fault. Transport connections will be automatically restored using Duration's virtual IP addressing mechanisms.

Another aspect of the invention is a method, system, improvement and/or computer program that provides a mechanism to ensure that the distributed applications sub-programs are launched in the proper order and with the proper timing constraints during recovery. In one embodiment, a mechanism is also provided to ensure that application programs are recovered in the proper order.

Another aspect of the invention is a method, system, computer program, computer executable program, or improvement wherein user controllable launch of sub-programs for the distributed application is provided.

Another aspect of the invention is a method, system, computer program, computer executable program, or improvement wherein user controllable stop of sub-programs and distributed applications is provided.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 8 is a block diagram of an alternate approach to flushing the transport buffers and checkpointing of the transport state according to an aspect of the present invention.

DETAILED DESCRIPTION

Referring more specifically to the drawings, for illustrative purposes the present invention will be described in relation to FIG. 1 through FIG. 8. It will be appreciated that the system and apparatus of the invention may vary as to configuration and as to details of the constituent components, and that the method may vary as to the specific steps and sequence, without departing from the basic concepts as disclosed herein.

1. Introduction

The context in which this invention is described is a distributed application program consisting of any number of sub-programs. Each sub-program runs on a primary node and can be supported by one or more designated backup nodes. Without affecting the general case of multiple backups, the following describes scenarios where each sub-program has one primary node and one backup node. Multiple backups are handled in a similar manner as a single backup.

The mechanisms for transparently loading applications, transparently registering applications for protection, transparently detecting faults, and transparently initiating recovery are described in the first reference above which was incorporated by reference.

The mechanisms for taking checkpoints of multi-process, multi-threaded processes and restoring from those checkpoints are described in the second reference above which was incorporated by reference.

Figure 1:
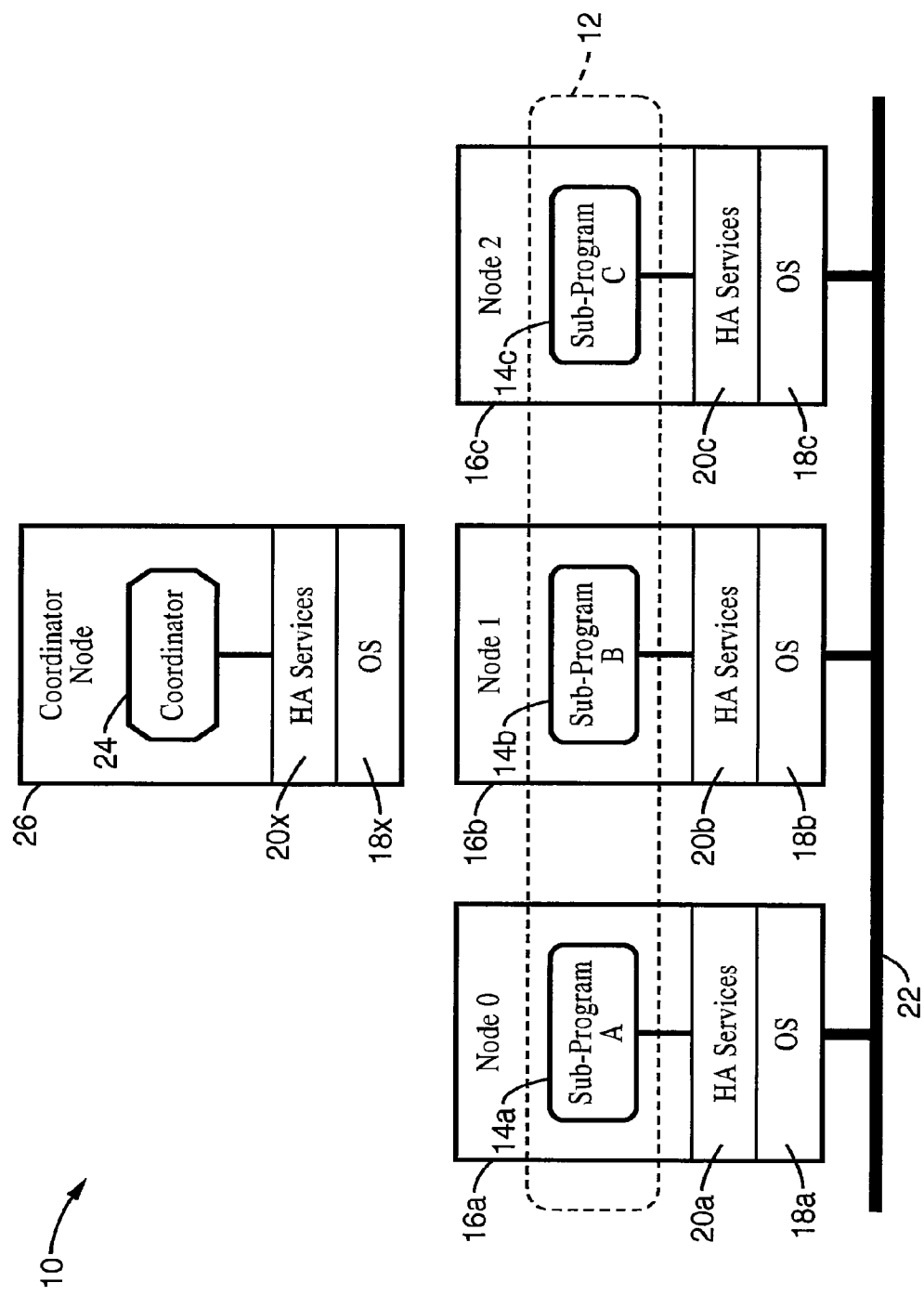
FIG. 1 is a block diagram of a distributed application with multiple sub-programs and a coordinator, according to an embodiment of the present invention.

FIG. 1 illustrates, by way of example embodiment 10, a distributed application 12 consisting of multiple sub-programs which are exemplified as sub-programs 14a, 14b and 14c. By way of example, each sub-program is shown running on a different node 16a, 16b and 16c. Each node runs a copy of the operating system (OS) 18a, 18b and 18c, and each node runs an instance of what is referred to herein, by way of example and not limitation, as "High-Availability Services" (HA Services) 20a, 20b and 20c, according to the present invention. Every node is connected using a transport connection 22, or simply called transport, such as TCP/IP, shared memory, or MPI. A coordinator program 24 runs on a coordinator node 26 which is also shown with OS 18x and HA services 20x.

Figure 2:
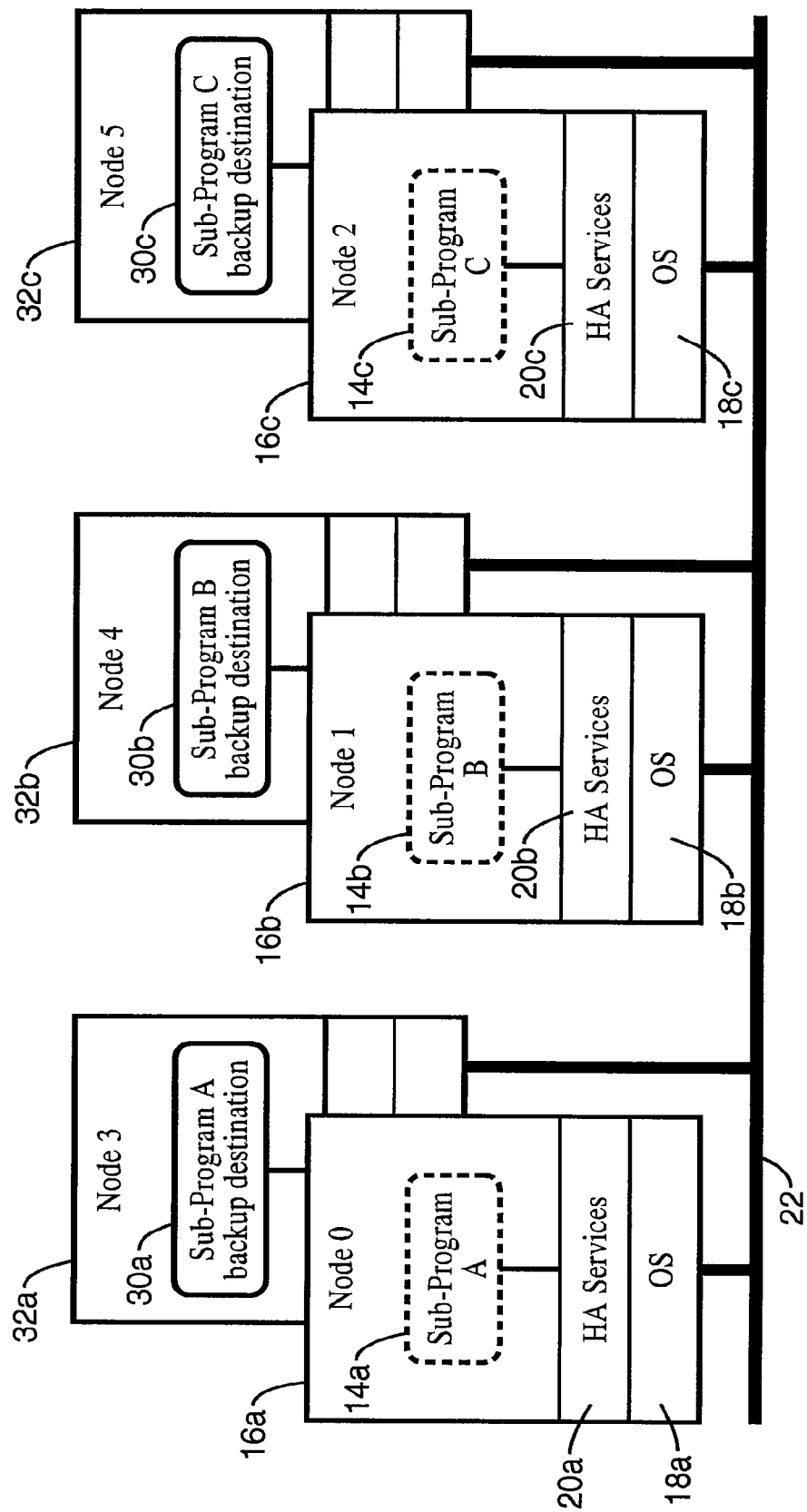
FIG. 2 is a block diagram of a distributed application with multiple sub-programs according to an aspect of the present invention, and showing backup locations for each sub-programs.

FIG. 2 illustrates by way of example a failover scenario for the multiple sub-programs from FIG. 1, wherein for the sake of simplicity of illustration a single backup is shown for each of the primary nodes 16a, 16b and 16c. Sub-program A 14a which is running on node 0 16a has node 3 32a as its designated failover location with sub-program 30a. Sub-program B 14b which is running on node 1 16b has node 4 32b as its designated failover location with sub-program 30b. Sub-program C 14c which is running on node 2 16c has node 5 32c as its designated failover location with sub-program 30c. Accordingly, each sub-program has one or more designated backup locations. It should be appreciated that the backup locations can be the same as the primary location, so that all restoration after faults will be on the same node.

Figure 3:
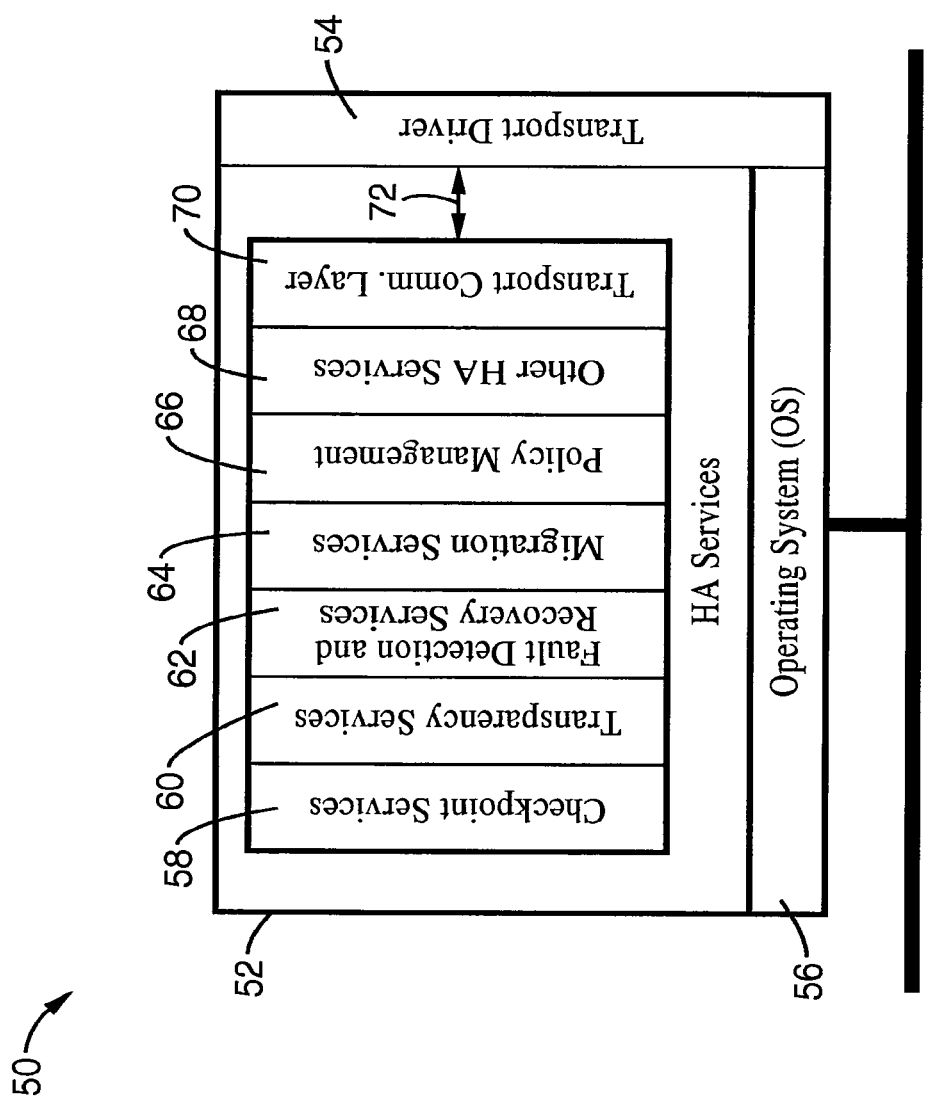
FIG. 3 is a block diagram of components comprising the HA infrastructure according to an aspect of the present invention.

FIG. 3 illustrates by way of example embodiment 50 a node having various program modules including HA services 52, transport driver 54, and operating system 56. By way of example, and not limitation, the HA services include checkpointing services 58, transparency services 60, fault detection and recovery services 62, migration services 64, policy management 66, other HA services 68, and transport communication layer (TCL) 70. The transport driver 54 provides the local transport implementation. Less preferably, HA services may comprise a subset, or superset, of the above functionality without departing from the teachings of the present invention.

TCL 70 is responsible for interfacing 72 with local transport driver 54 and generally executes as a service in combination with other services provided by HA services 58-68. In the following disclosures TCL can be considered as a component within HA services 52 without explicitly showing TCL on the diagrams.

2. Taking a Distributed Application Checkpoint

Figure 4:
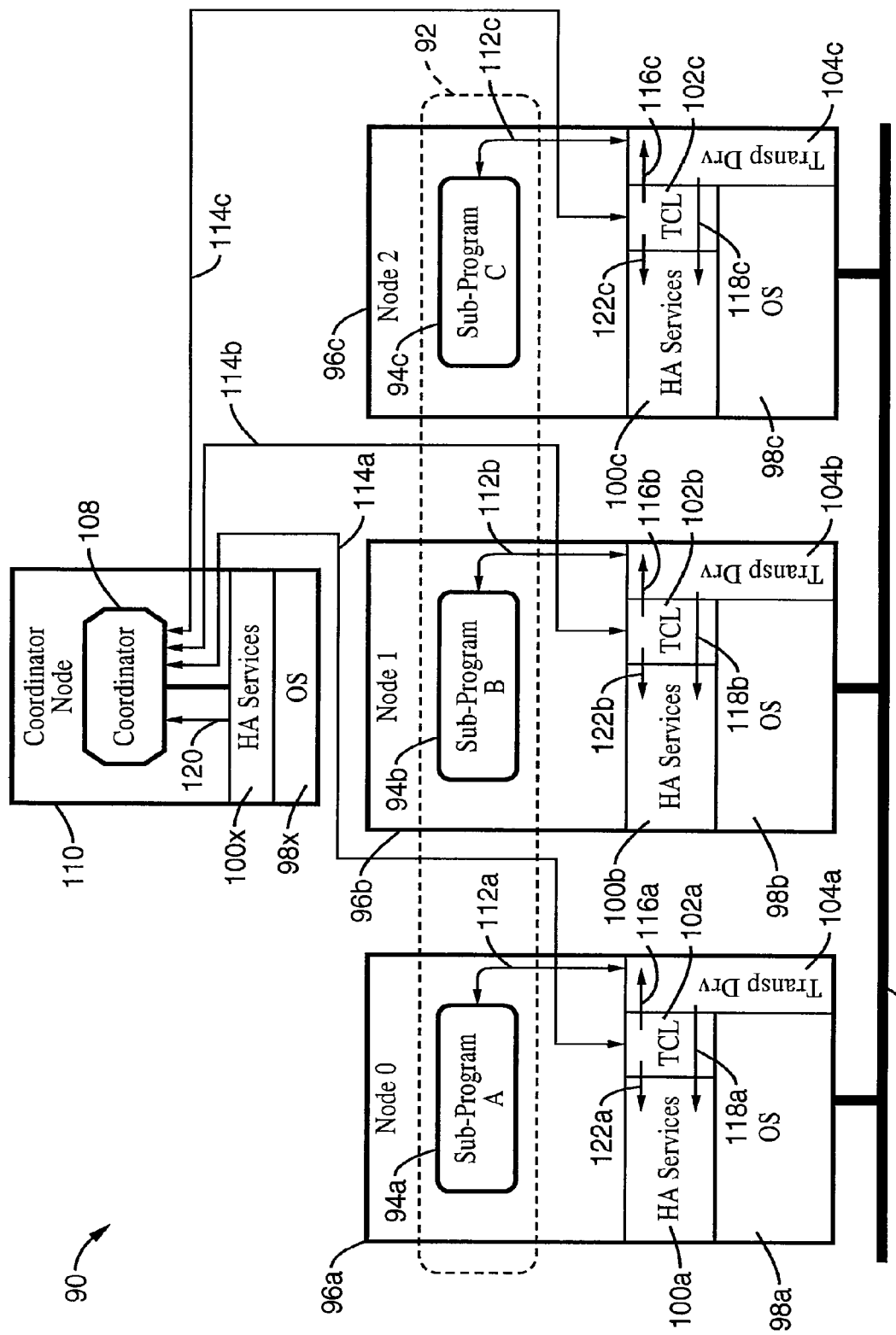
FIG. 4 is a block diagram of the process of taking a consistent distributed checkpoint according to an aspect of the present invention.

FIG. 4 illustrates by way of example embodiment 90, the manner in which distributed checkpoints are taken across the grid. Checkpointing of single node multi-process multi-threaded applications is described in the second reference given above. By way of example, and not limitation, the distributed application consists of a distributed application 92 with multiple subprograms, exemplified as sub-program A 94a, sub-program B 94b, and sub-program C 94c within nodes 96a, 96b and 96c. Also within each node is depicted an OS layer 98a, 98b and 98c, HA services 100a, 100b and 100c, as well as TCL 102a, 102b and 102c, and a transport driver 104a, 104b and 104c. A transport connection 106 is shown, such as TCP/IP, shared memory, MPI, or similar communication means. Coordinator 108 is shown running on a coordinator node 110, and is also shown with OS 98x and HA services 100x.

Sub-program A 94a communicates with its transport driver 104a via channel 112a, sub-program B 94b communicates with transport driver 104b via channel 112b, while sub-program C 94c communicates with transport driver 104c via channel 112c.

By way of example and not limitation, the checkpointing process is initiated from the coordinator 108 within coordinator node 110. When the checkpointing process is triggered, coordinator 108 sends a message 114a to TCL 102a within HA services 100a of node 0 96a, message 114b to TCL 102b within HA services 100b of node 1 96b, and a message 114c to the TCL within HA services 100c for node 2 96c.

The TCL 102a on node 0 stops processing traffic and sends a message 116a to transport driver 104a on node 0 96a, to stop processing and flush all buffers. Similarly, TCL 102b on node 1 96b stops processing traffic and sends a message 116b to transport driver 104b on node 1 to stop processing and flush all buffers, while TCL 102c on node 2 96c stops processing traffic and sends a message 114c to transport driver 104c on node 2 96c to stop processing and flush all buffers.

When transport driver 104a has been completely stopped and flushed, the transport drivers sends a message 118a to HA services 100a to checkpoint sub-program A 94a. When transport driver 104b has been completely stopped and flushed, it sends a message 118b to HA services 100b to checkpoint sub-program B 94b. When transport driver 104c has been completely stopped and flushed, it sends a message 118c to HA services 100c to checkpoint subprogram C 94c.

By way of example, and not limitation, the messaging provided by 116a, 116b, 116c, 118a, 118b and 118c can be provided by any desired communication structures including: pipes, FIFOs, library call-backs, shared memory, IPC messages, TCP messages, or the like. The HA services running on each node checkpoint sub-program A 96a, sub-program B 96b, and subprogram C 96c. It should be appreciated that since the transport is stopped and not processing any messages, it is guaranteed that the relative states of sub-programs A, B and C are fixed.

To create the checkpoint for the entire distributed application, first the checkpoint of subprogram A 94a is combined with the checkpoint of the local TCL 102a and transport driver 104a on node 0 96a. This same procedure applies for sub-program B 94b, local TCL 102b and transport driver 104b on node 1 96b, and sub-program C 94c, local TCL 102c and transport driver 104c on node 2 96c. Finally, all combined sub-program checkpoints and local transport checkpoints are assembled into one checkpoint for the entire distributed application. Halting and checkpointing of the transport is described in further detail below.

When checkpointing of sub-program A 94a has completed, TCL 102a sends a message 114a to the coordinator 108, that checkpointing of sub-program A 94a has completed. Similarly, when checkpointing of sub-program B 94b has completed, TCL 102b sends a message 114b to coordinator 108 that checkpointing of sub-program B 94b has completed, and when checkpointing of sub-program C 94c has completed TCL 118c sends a message 114c to coordinator 108 that checkpointing of sub-program C 94c has completed. Coordinator 108 waits for all checkpoints to be completed and sends message 114a to TCL 102a to resume operation of sub-program A 94a, and similarly sends message 114b to TCL 102b to resume operation of subprogram B 94b, and message 114c to TCL 102c to resume operation of sub-program C 94c. The distributed application consisting of sub-program A 94a, sub-program B 94b and sub-program C 94c is now running again.

By way of example, the checkpointing process can also be initiated from the HA services 100x on coordinator node 110. In this case HA services 100x sends a message 120 to coordinator 108, which proceeds as described above.

3. Restoring from a Distributed Application Checkpoint

FIG. 4 also illustrates by way of example the process of restoring from a distributed checkpoint. Restoring from checkpoints of single node multi-process multi-threaded application is described in the second reference above. The following discussion assumes that the distributed checkpoint has been assembled using the mechanism described above.

By way of example and not limitation, the restoration process is initiated from coordinator 108, which sends message 114a to TCL 102a within HA services 100a for node 0 96a, and similarly message 114b to TCL 102b within HA services 100b for node 1 96b, as well as message 114c to TCL 102c within HA services 100c for node 2 96c.

TCL 102a on node 0 96a stops processing traffic and sends a message 122a to HA services 100a on node 0 96a to restore sub-program A 94a from the most recent checkpoint. In a similar manner, TCL 102b on node 1 96b stops processing traffic and sends a message 122b to HA services 100b on node 1 96b to restore sub-program B 94b from the most recent checkpoint. Following the same pattern TCL 102c on node 2 96c stops processing traffic and sends a message 122c to HA services 100c on node 2 96c to restore sub-program C 94c from the most recent checkpoint.

The restore process includes restoring local transport drivers 104a, 104b and 104c as well as TCLs 102a, 102b and 102c. Halting and checkpoint restore of the local transport is described in further detail below.

Restoration from checkpoints, as just described, is commonly performed as part of the fault recovery process. After a fault, one or more of the sub-programs may have crashed, exited, or otherwise ceased functioning.

According to one aspect of the invention, HA services 100a terminates sub-program A 94a, if running, before restoring; while HA services 100b terminates sub-program B 94b, if running, before restoring; and finally HA services 100c terminates sub-program C 94c, if running, before restoring. This sequence of termination before restoration guarantees that all subprograms are loaded and functional.

According to another aspect of the invention, HA services 100a halts sub-program A 94a, if running, before restoring; while HA services 100b halts sub-program B 94b, if running, before restoring; and finally HA services 100c halts sub-program C 94c, if running, before restoring. This sequence also guarantees that all sub-programs are loaded and functional.

By way of example, the restore process can also be initiated from HA services 100x on coordinator node 110. In this case HA services 100x sends a message 120 to coordinator 108, which then proceeds as described above.

4. Application Fault Detection and Restore of Distributed Application

Figure 5:
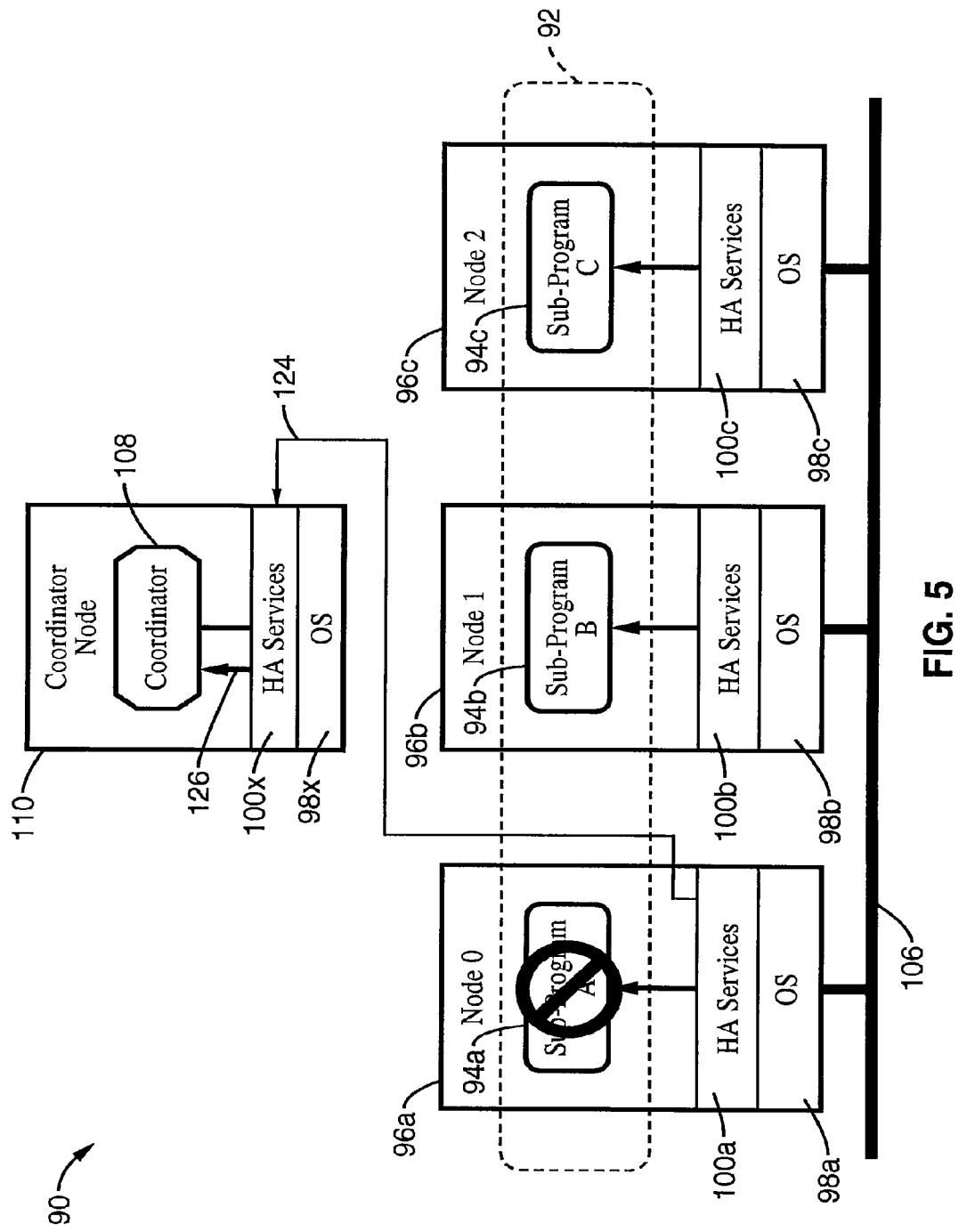
FIG. 5 is a block diagram of application fault detection and restoration from a distributed checkpoint according to an aspect of the present invention.

FIG. 5 illustrates by way of example embodiment 90, the detection of faults with initiation of a coordinated restore. Fault detection of single node multi-process multi-threaded application is described in the first related application reference cited above. Returning to FIG. 5, it is seen that the example illustrates a scenario where sub-program A 94a fails. As described according to the Duration system, local fault detection is provided by local HA services 100a. Wherein local HA services 100a sends a message 124 to HA services 100x on coordinator node 110. HA services 100x then sends a restore message 126 to coordinator 108. The "restore from distributed checkpoint" proceeds as described above.

5. Fault Detection for Node and Network Faults

Figure 6:
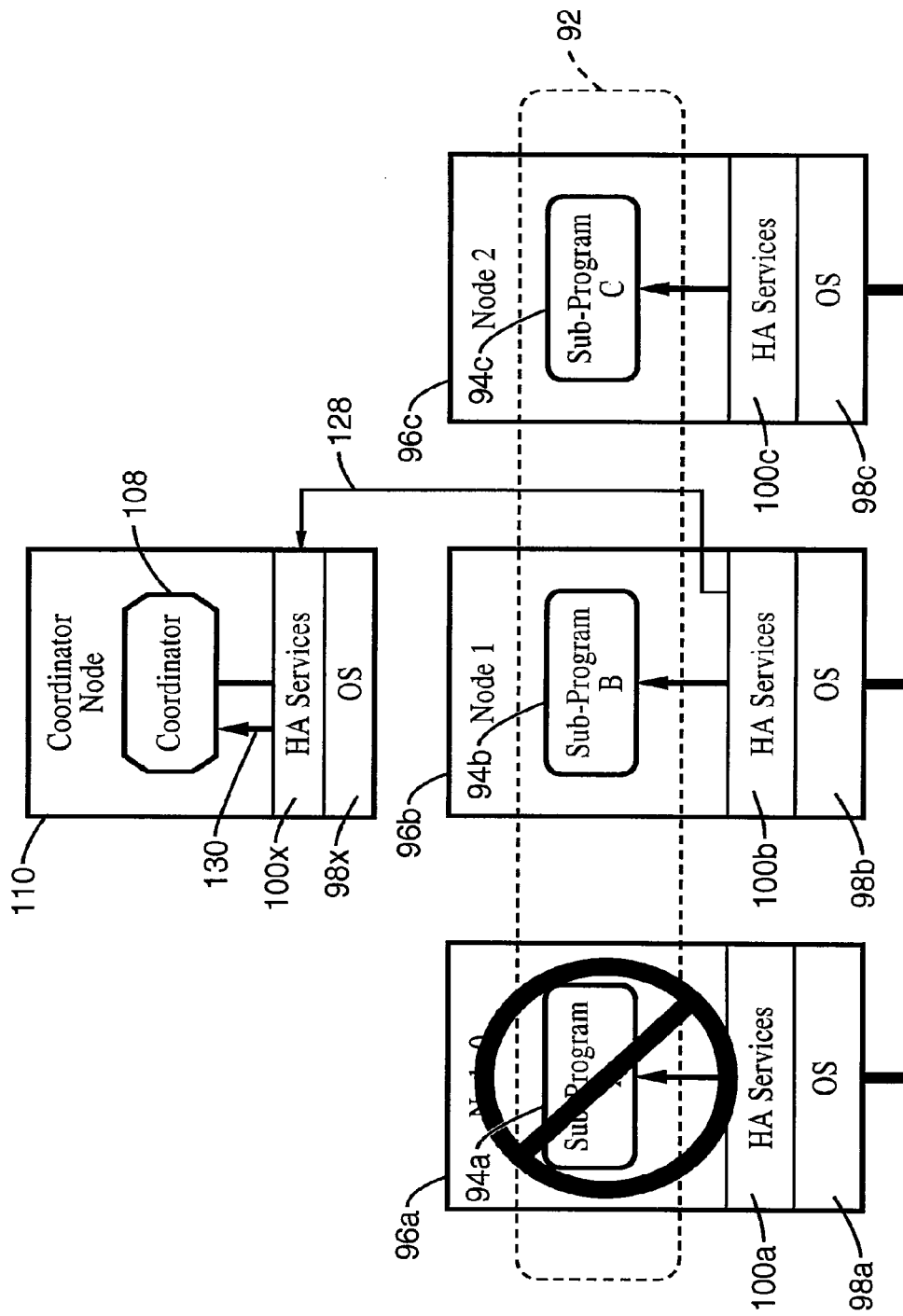
FIG. 6 is a block diagram of fault detection and restoration from a distributed checkpoint according to an aspect of the present invention.

FIG. 6 illustrates by way of example the detection and recovery of node faults. Node and network fault detection are described in the first related application reference cited above.

The example illustrates a scenario where node 1 96b serves as backup location for sub-program A 94a. A node fault means that the entire node has gone down, due to a hardware or software fault. Network faults cause the entire node to become unreachable due to network outage.

HA services 100b for the backup-location of sub-program A 94a performs the fault detection. HA services 100b sends a message 128 to HA services 100x for coordinator 108. HA services 100x sends a restore message 130 to coordinator 108. The "restore from distributed checkpoint" proceeds as described above.

6. Stopping and Flushing the Transport

Figure 7:
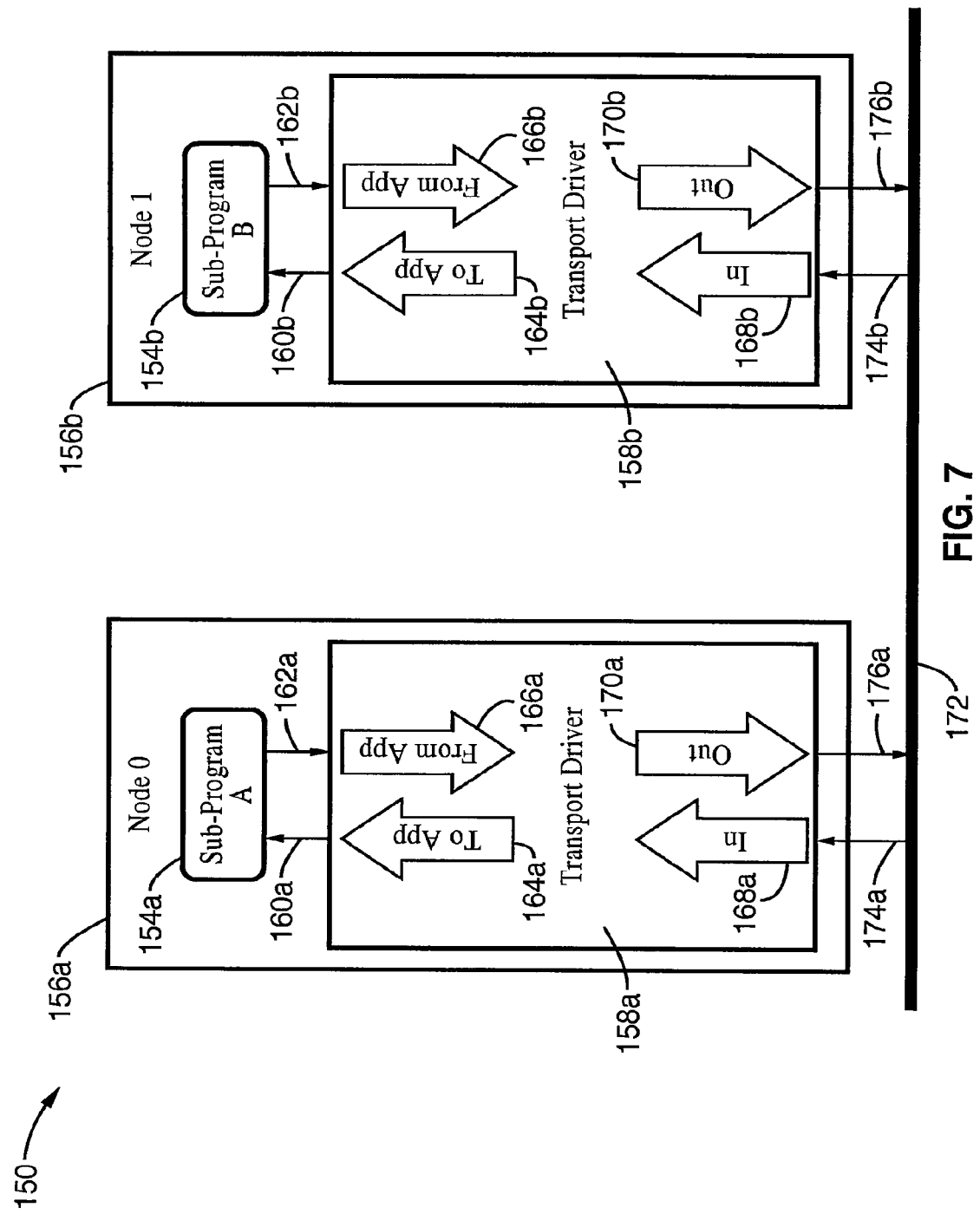
FIG. 7 is a block diagram of flushing transport buffers and checkpointing of the transport state according to an aspect of the present invention.

FIG. 7 illustrates by way of example embodiment 150 the process of stopping and flushing the transport. It should be pointed out that stopping and flushing all transport buffers is integral toward ensuring consistent and accurate checkpoints within distributed applications. Sub-program A 154a is running on node 0 156a and sub-programs B 154b is running on node 1 156b. Sub-program 154a receives data from the transport driver 158a via message channel 160a and sends messages via channel 162a. The figure illustrates a two node configuration, albeit it should be appreciated that the description naturally extends to any desired number of nodes.

For node 0, the transport driver 158a contains a buffer 164a for messages going to the sub-program, and a buffer 166a for receiving messages from the application. For sub-program B 154b the transport driver 158b contains a buffer 164b for messages going to the sub-program, and a buffer 166b for receiving messages from the sub-program. Node 0 156a also contains within transport driver 158a, a buffer 168a for incoming transport messages, and a buffer 170a for outgoing transport messages. Similar buffer configuration is seen for node 1, with buffers 164b, 166b, 168b and 170b within transport driver 158b.

A transport mechanism 172 is shown with the lowest layer of transport containing a message channel 174a directed into the transport driver 158a of node 0 156a, and a message channel 176a directed out of the transport driver. Node 1 156a is similarly shown with message channels 174b, 176b.

By way of example and not limitation, the message channels between the transport driver and the applications, or between the transport and the driver, can be implemented as containing any desired number and configuration of pipes, FIFOs, sockets, message queues, DMA, shared memory, or custom protocols.

Halting and flushing the transport driver is a multi-step process. In one embodiment, the transport driver first stops sending out new messages. By way of example, this means that the driver blocks message channels 164a and 170a on node 0 156a, and message channels 164b and 170b on node 1 156b.

The transport driver proceeds to receive all incoming messages delivered on message channel 166a and 168a on node 0 156a, and message channel 166b and 168b on node 1 156b. Those messages are received and stored in the outgoing message queues for delivery after the checkpointing process.

On node 0 156a, channel 176a will not send new messages and channel 174a will receive all messages sent to it. On node 1 channel 176b will not send new messages and channel 174b will receive all messages sent to it. When no more messages are "in transit", the communication channel 172 has been flushed and the transport traffic halted.

7. Checkpointing the Transport

Referring to FIG. 7 for illustrative purposes, checkpointing of the local transport 158a on node 0 156a and local transport 158b on node 1 156b is achieved by using the standard checkpointing mechanism for single or multi process, multi-threaded applications, such as found in the Duration system referred to in the first and second patent application references above, or similar systems and methods.

8. Restoring the Transport from a Checkpoint

Referring to FIG. 7 for illustrative purposes, a restore from a checkpoint of local transport 158a on node 0 156a, and local transport 158b on node 1 156b is achieved by using the standard checkpointing mechanism for single or multi-process, multi-threaded application, such as found in the Duration system referred to in the first and second patent application references above, or similar systems and methods.

9. Alternate Implementation of Transport and Flushing Operation

By way of example, the disclosure above describes a transport driver architecture in which the transport driver is responsible for receiving, halting and flushing messages and issuing the messages to let sub-programs continue after checkpointing.

An alternate implementation layers the TCL between the application and the transport driver, thereby forcing all communication between application and transport driver to go through the TCL.

FIG. 8 illustrates an example embodiment 190, in which sub-program A 154a now communicates with TCL 192a instead of transport driver 158a. In addition to the previously described role of coordinating flush, halt and continue operations with the coordinator, TCL 192a is now also responsible for flushing the transport driver and for triggering checkpointing and restoration.

The alternate architecture illustrated by FIG. 8 is particularly well suited for those transport drivers in which the transport driver does not provide built-in flush capability. TCL 192a then assumes responsibility for buffering and flushing all transport data.

The inter-positioning of TCL 192a between the application and the transport driver does not in any substantial way alter operations discussed above.

10. Loss-less Migration of Distributed Applications

Referring once again to FIG. 2 for illustrative purposes, the case of migrating the distributed application from one set of nodes to another set of nodes is considered. Migration of live applications is preferably utilized in responding to the anticipation of faults, such as detecting that a CPU is overheating, a server is running out of memory, and the like, when the administrator wants to re-configure the servers or when the servers currently being used have to be freed up for some reason.

Building on the disclosures above, a loss-less migration is achieved by: first checkpointing the distributed application, including all sub-programs and local transports, then restoring all sub-programs and local transports from the checkpoints on the backup nodes. The migration is loss-less, which means that no data or processing is lost, since the transport and all sub-programs have been halted.

11. Conclusion

In the embodiments described herein, an example programming environment was described for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of achieving transparent integration of a distributed application program with a high availability protection program, comprising:
   injecting registration code, transparently and automatically, into a plurality of sub-programs during launch, without the need of modifying or recompiling the application program and without the need of a custom loader;
   registering the distributed application automatically with a high-availability protection program;
   detecting a failure in the execution of the distributed application program by said high-availability protection program; and
   executing the distributed application, subject to the detected failure, with one or more of the sub-programs being executed from their respective backup nodes automatically by said high-availability protection program in response to the failure.

2. A method as recited in claim 1, wherein said high-availability protection program is configured as an extension of an operating system, wherein recovery of application programs by said high-availability protection program is performed without the necessity of modifying programming within said application programs.

3. A method as recited in claim 1, wherein said high-availability protection program is configured for protecting against node faults, network faults, and process faults.

4. A method as recited in claim 1, wherein said high-availability protection program is configured to automatically coordinate transparent recovery of distributed applications.

5. A computer program product having a non-transitory computer readable medium recording computer program logic for achieving transparent integration of a distributed application program with a high availability protection program, the computer program product comprising:
   code to inject registration code, transparently and automatically, into a plurality of sub-programs during launch, without the need of modifying or recompiling the application program and without the need of a custom loader;
   code to register the distributed application automatically with a high-availability protection program;
   code to detect a failure in the execution of the distributed application program by said high-availability protection program; and
   code to execute the distributed application, subject to the detected failure, with one or more of the sub-programs being executed from their respective backup nodes automatically by said high-availability protection program in response to the failure.

6. The computer program product as recited in claim 5, wherein said high-availability protection program is configured as an extension of an operating system, wherein recovery of application programs by said high-availability protection program is performed without the necessity of modifying programming within said application programs.

7. The computer program product as recited in claim 5, wherein said high-availability protection program is configured for protecting against node faults, network faults, and process faults.

8. The computer program product as recited in claim 5, wherein said high-availability protection program is configured to automatically coordinate transparent recovery of distributed applications.

* * * * *